United States Patent Office 2,993,081
Patented July 18, 1961

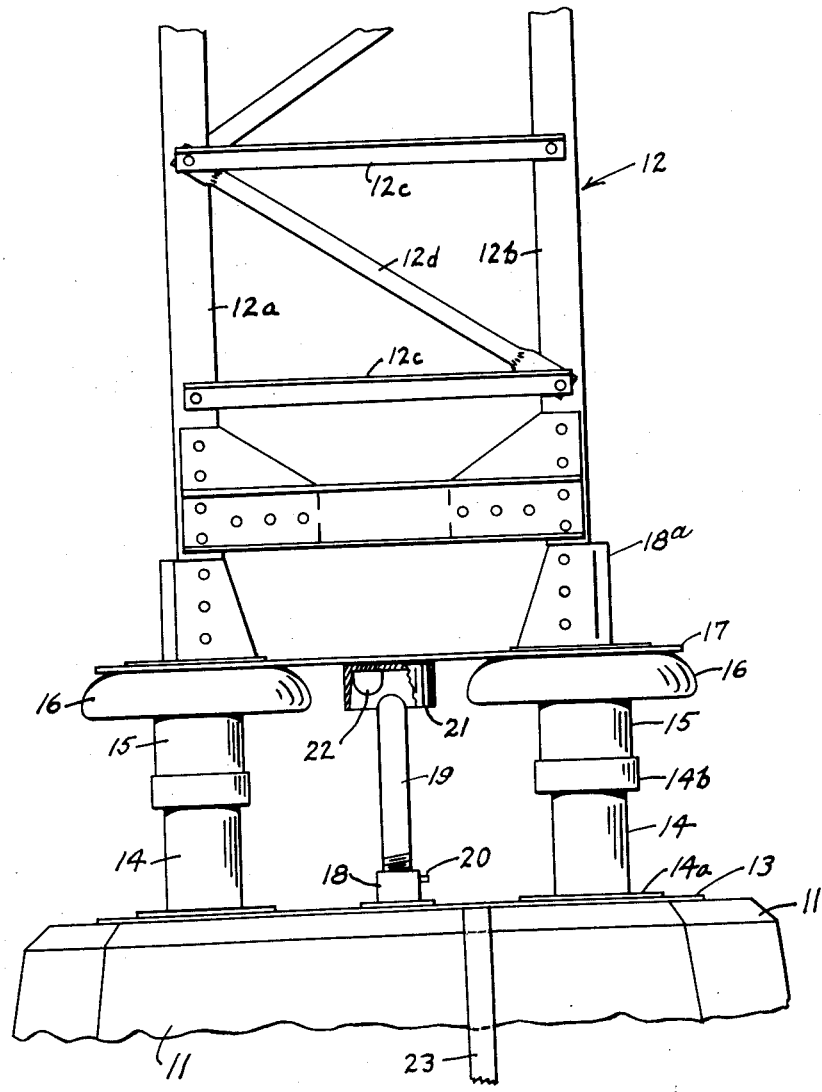

2,993,081
TOWER SUPPORT AND LIGHTNING ARRESTER
Albert C. Veldhuis, West Chester, Pa., assignor to Wind Turbine Company, Chester, Pa., a corporation of Pennsylvania
Filed Aug. 22, 1957, Ser. No. 679,731
4 Claims. (Cl. 174—2)

This invention relates to supports for metal towers which are to be insulated from the ground and to a lightning arrester embodied in the support. More particularly, this invention relates to a tower with a lightning arrester of the air break or gap type.

In electrical distribution systems employing towers or in antennae towers it is necessary to provide some means for protecting the lines and connected apparatus against potential disturbances generally termed lightning. As lightning is the most frequent cause of these disturbances, such devices are usually known as lightning arresters. A lightning arrester operates by discharging the excessive potential to ground with the least possible delay, with as little disturbance and damage to the apparatus and lines as is possible. The gap arresters of the type to which the present invention relates consist generally of a pair of proximate electrodes, one connected to the tower and the other connected to ground. The two electrodes are separated by a gap which imparts a resistance small enough to relieve the disturbance on the line, but at the same time have a sufficient resistance to exclude the flow of any appreciable amount of dynamic current which tends to follow the discharge to earth.

The difficulty hereinbefore encountered in the employment of a gap between the two electrodes is the inability to adjust the size of the gap and to maintain the gap constant in all types of weather in order to secure satisfactory operation of the arrester.

Towers of the type under discussion are oftentimes provided with insulators between the base and the tower proper. If the insulator is low to the ground, snow may pile up around the insulator which can result in effectively grounding the tower. On the other hand, rain can run down over the insulator causing the tower to be grounded through a film of rain water.

Accordingly, it is an object of the present invention to provide, in combination, a tower with supporting insulators which are weatherproof and a lightning arrester which is also weatherproof.

It is another object of the present invention to provide a lightning arrester having a resistance gap which is adjustable.

It is still another object of the invention to provide a lightning arrester having a resistance gap which is weatherproof.

It is yet another object of the invention to provide a lightning arrester having a resistance gap which is easily constructed, rigid and has a long life.

With the foregoing and other objects in view, the invention will be more fully described hereinafter, and will be more particularly pointed out in the claims appended hereto.

Referring to the drawing:
The figure is a side elevation of the tower with a fragmentary cross-section of the lightning arrester gap.

In the drawing, numeral 11 refers to a concrete pedestal resting on the ground and providing the primary supporting base for a metal tower assembly indicated generally at 12. Usually the tower is formed of three or more vertical spars, such as 12a, 12b, etc., held in spaced parallel relation by horizontal bracing 12c at spaced points and diagonal bracing 12d between such points. The spars are spaced in two directions so that the bracing encloses an area of polygon shape. The drawing represents a tower formed of four spars arranged at the corners of a square, only two of the spars being shown.

The tower 12 is supported on the pedestal by a supporting structure which insulates the tower from the ground and also embodies a lightning arrester. This supporting structure includes a conducting lower base plate 13 resting on the top of the concrete pedestal 11 and being anchored thereto in any suitable manner. A number of stand-off insulators are supported on base plate 13, one for each spar and positioned directly below the spar. The insulators are all alike and are formed of a metal stand section 14 having a base flange 14a secured to plate 13 and a collar 14b at the top end forming a socket for the lower end of the insulating section 15. A rain shield 16 in the form of an inverted metal dish is carried at the upper end of insulator section 15. This shield extends downwardly over a portion of section 15 and may be formed of sheet material or may be cast integrally with a metal cap or collar receiving the upper end of section 15. A secondary base plate 17 formed of metal is mounted on top of and connects the insulator covers 16 to hold the upper ends of the insulators in fixed positions. Footing pieces 18a connect the lower ends of the tower legs with the plate 17 by any suitable securing means. By locating a stand-off insulator directly below each spar, plate 17 is not subjected to any bending movement and need not be of substantial thickness.

A lightning arrester is provided between the primary base plate 13 and the secondary base plate 17. It comprises a conducting base socket 18 mounted substantially in the center of primary base plate 13 and having an internally threaded socket. A vertical rod 19 is screwed into the threaded base portion 18 at its lower end and is locked into position by lock screw 20. The rod has a rounded upper end portion. A conducting shield 21 in the form of an inverted cup is suitably mounted on the underside of secondary base plate 17 and extends over the vertical rod 19. The depending flange of shield 21 extends downwardly sufficiently to cover the upper end of rounded rod 19. A depending rod 22 is affixed to the bottom wall of shield 21 and has its downward end portion terminating above the lower edge of the cup flange and being rounded. Rods 22 and 19 are in an offset relationship to one another but their rounded ends are spaced apart to provide a discharge gap. In order to complete the connection to ground a metal strip 23 is connected between ground and the primary base plate 13.

It will be appreciated that the insulator stands 14 separate the insulator sections 15 from concrete base 11 sufficiently so that snow cannot pack around the insulators 15 to short the tower. In other words, only a certain amount of snow can be retained by the concrete pedestal 11; any amount beyond the limit will fall off onto the ground. The height of stands 14 may be varied to take into consideration the amount of snowfall for any given geographical locality.

The insulator covers 16 prevent rain water from running down over the surface of the insulator sections 15. The rain water collected by the tower must run to the edge of the cover and then fall clear of the insulators. The insulator covers 16 are located sufficiently above the concrete pedestal so that a continuous stream of rain water is obviated, but rather, the rain water must fall dropwise. By mounting the insulator sections 15 on stands 14 it is possible to provide a free fall for rain water several times the height of the insulator sections 15. It will be appreciated by those familiar with the art that water flowing over the surfaces of insulators provide fairly good conduits to short or ground antennae towers or towers carrying electric transmission lines, and the like. Furthermore, the insulator covers 16 have a sufficiently large diameter so that only a rain driven at a high angle from the vertical plane could possibly strike the insulator sections 15.

In connection with the lightning conduit it is pointed out that the depending flange of shield 21 has the same function as insulator covers 16, that is, the shield prevents rain water from flowing from the tower onto rod 19 which could thereby short the tower. The rods 19 and 22 are offset with respect to each other to achieve a further safeguard so that any water dripping down from the rounded end of rod 22 would fall free of rod 19. It will be appreciated that, thereby, the size of the gap will never be varied by depending droplets of water.

The gap between rods 19 and 22 may be adjusted for proper breakdown voltage by means of the threaded bottom portion of rod 19. The rod may be screwed up or down and locked in place to vary the size of the gap between rods 19 and 22.

In the embodiment described in the above and illustrated by the drawing the upper shield 21 and rod 22 are shown to be anchored to the underside of secondary base plate 17. In the event that the use of secondary base plate 17 is not found desirable it may be entirely eliminated. In such an instance the shield 21 and rod 22 may be secured to the underside of a cross-piece secured to the legs of the tower above their lower ends. The lightning arrester does not have to be substantially in the center of the tower arrangement as shown in the illustrated embodiment, but this is the preferred arrangement because the upper plate 17 provides substantial protection to the arrester 19—22 against the action of rain, snow and sleet.

What is claimed is:

1. A support for a tower having at least three legs comprising a pedestal resting upon the ground beneath said tower, a first conducting plate supported horizontally on the top of said pedestal, a number of stand-off insulators supported on said plate and being secured thereto, one for each tower leg and positioned directly below the end of the leg, a second conducting plate supported horizontally by the top portions of said insulators and joining the lower ends of the tower legs, and means providing a lightning arrester gap between said plates substantially at the center of said second plate and closely spaced from the lower side thereof, said second plate being solid and providing a protective cover for said arrester gap to prevent falling rain from entering said gap.

2. A tower support according to claim 1 wherein each of said stand-off insulators comprises a conducting stand portion secured to said first conducting plate and carrying an insulator section at its upper end, whereby said insulator is spaced from said lower plate by the length of said stand portion, and an inverted dished shield carried by the top of the insulator section and being electrically connected to said second conducting plate, said stand portion having a vertical length sufficient to provide a gap between the edge of said shield and said first plate substantially greater than the length of said insulator section.

3. A tower support according to claim 1 wherein said arrester gap is formed between a short conducting rod extending downwardly from said second plate and a longer rod extending upwardly from said first plate, said rods being laterally off-set with respect to each other to prevent water from dripping from the upper rod onto the lower rod.

4. A support for a tower having at least three legs comprising a pedestal resting upon the ground beneath said tower, a conducting plate supported horizontally on the top of said pedestal, a number of stand-off insulators supported on said plate and being secured thereto, one for each tower leg and positioned directly below the end of the leg, a conducting member joining the lower ends of the tower legs above the insulators, and means providing a lightning arrester gap between said conducting member and said plate comprising a conducting cup supported in inverted position from said conducting member, a short gap-electrode supported within said cup, a long gap-electrode supported on said plate and extending upwardly into said cup in laterally off-set relation to said short electrode.

References Cited in the file of this patent
UNITED STATES PATENTS

| | | |
|---|---|---|
| 1,651,876 | Evans | Dec. 6, 1927 |
| 1,937,964 | Jenner | Dec. 5, 1933 |
| 2,008,931 | Schuler | July 23, 1935 |
| 2,027,733 | Jenner | Jan. 14, 1936 |

OTHER REFERENCES

Publication: Wireless World, Feb. 25, 1925, page 84.

UNITED STATES PATENT OFFICE
CERTIFICATE OF CORRECTION

Patent No. 2,993,081                July 18, 1961

Albert C. Veldhuis

It is hereby certified that error appears in the above numbered patent requiring correction and that the said Letters Patent should read as corrected below.

In the grant, lines 2 and 3, address of assignee, for "Chester, Pennsylvania," read -- West Chester, Pennsylvania, --; in the heading to the printed specification, line 4, address of assignee, for "Chester, Pa." read -- West Chester, Pa. --.

Signed and sealed this 12th day of December 1961.

(SEAL)
Attest:

ERNEST W. SWIDER
Attesting Officer

DAVID L. LADD
Commissioner of Patents

USCOMM-DC